United States Patent
Rosekrans (10) Patent No.: US 9,677,902 B2
(45) Date of Patent: *Jun. 13, 2017

(54) RANGE MARKER FOR A NAVIGATION SYSTEM

(71) Applicant: TOYOTA MOTOR ENGINEERING & MANUFACTURING NORTH AMERICA, INC., Erlanger, KY (US)

(72) Inventor: Darin Paul Rosekrans, South Lyon, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,849

(22) Filed: May 22, 2015

(65) Prior Publication Data

US 2016/0131498 A1 May 12, 2016

Related U.S. Application Data

(63) Continuation of application No. 12/942,746, filed on Nov. 9, 2010, now Pat. No. 9,043,134.

(51) Int. Cl.
*G01C 21/30* (2006.01)
*G01C 21/36* (2006.01)
*G01C 21/34* (2006.01)

(52) U.S. Cl.
CPC ..... *G01C 21/3682* (2013.01); *G01C 21/3469* (2013.01); *G01C 21/3626* (2013.01); *G01C 21/3697* (2013.01)

(58) Field of Classification Search
CPC combination set(s) only.
See application file for complete search history.

(56) References Cited

U.S. PATENT DOCUMENTS

| 5,790,973 | A | 8/1998 | Blaker et al. | |
|---|---|---|---|---|
| 6,459,967 | B1 * | 10/2002 | Otto | B60R 16/0231 701/29.1 |
| 6,691,025 | B2 * | 2/2004 | Reimer | G01F 23/296 340/450 |
| 6,864,807 | B2 * | 3/2005 | Todoriki | B60L 11/184 235/384 |

(Continued)

FOREIGN PATENT DOCUMENTS

| JP | 2000-283774 | 10/2000 |
|---|---|---|
| JP | 2000-292195 | 10/2000 |

(Continued)

*Primary Examiner* — Jonathan L Sample
(74) *Attorney, Agent, or Firm* — Snell & Wilmer LLP (57) ABSTRACT

Devices, methods and systems are disclosed herein to describe a range marker for a navigation system. The range marker may delineate a bounded area within a navigation map that a vehicle may travel based on the amount of fuel remaining. As the fuel continues to decrease during operation of the vehicle, the range marker may become smaller and smaller indicating a shrinking range since the fuel remaining decreases, thereby allowing the driver to easily identify which gas stations may be within a range of the vehicle (based on a current vehicle fuel level) and which gas stations might not be within the range of the vehicle.

20 Claims, 8 Drawing Sheets

(56) References Cited

U.S. PATENT DOCUMENTS

| | | | |
|---|---|---|---|
| 7,049,982 B2* | 5/2006 | Sleboda | G01C 21/26 340/539.1 |
| 7,066,216 B2* | 6/2006 | Sato | G06Q 30/08 141/231 |
| 7,206,720 B2 | 4/2007 | LaPant | |
| 7,668,644 B2* | 2/2010 | Tengler | G01C 21/36 340/450.2 |
| 7,672,756 B2 | 3/2010 | Breed | |
| 7,849,944 B2* | 12/2010 | DeVault | B60K 6/365 180/65.265 |
| 7,899,583 B2* | 3/2011 | Mendelson | G08G 1/14 340/932.2 |
| 7,999,664 B2* | 8/2011 | Barajas | B60R 25/00 340/438 |
| 9,043,134 B2* | 5/2015 | Rosekrans | G01C 21/3469 340/988 |
| 2003/0018743 A1 | 1/2003 | Tagi | |
| 2004/0062963 A1* | 4/2004 | Umayahara | B60L 11/1881 429/429 |
| 2004/0172193 A1* | 9/2004 | Monde | G01C 21/3679 701/425 |
| 2004/0236504 A1* | 11/2004 | Bickford | G01C 21/3679 701/408 |
| 2004/0260465 A1* | 12/2004 | Tu | G01C 21/34 701/426 |
| 2005/0146445 A1* | 7/2005 | Sleboda | G01C 21/26 340/988 |
| 2006/0058955 A1 | 3/2006 | Mehren | |
| 2006/0200284 A1 | 9/2006 | Hwang | |
| 2006/0253226 A1* | 11/2006 | Mendelson | G08G 1/14 701/1 |
| 2007/0244390 A1* | 10/2007 | Matsumura | A61B 8/08 600/437 |
| 2008/0033639 A1* | 2/2008 | Nakamura | G01C 21/32 701/532 |
| 2008/0065322 A1* | 3/2008 | Ng | G01C 21/3635 701/533 |
| 2008/0111665 A1* | 5/2008 | Hsi | G09B 29/106 340/286.14 |
| 2008/0125966 A1* | 5/2008 | Yamazaki | G01C 21/26 701/532 |
| 2008/0167812 A1* | 7/2008 | Geelen | G01C 21/3641 701/469 |
| 2008/0284678 A1 | 11/2008 | Randel et al. | |
| 2009/0005969 A1 | 1/2009 | Tamura | |
| 2009/0055094 A1* | 2/2009 | Suzuki | G09B 29/106 701/533 |
| 2009/0088964 A1* | 4/2009 | Schaaf | G01C 21/367 701/532 |
| 2009/0157289 A1* | 6/2009 | Graessley | B60L 3/12 701/123 |
| 2009/0171529 A1 | 7/2009 | Hayatoma | |
| 2009/0173311 A1* | 7/2009 | Roberts | B60W 30/182 123/198 F |
| 2009/0254234 A1* | 10/2009 | Noguchi | B60L 11/1881 701/22 |
| 2009/0265099 A1 | 10/2009 | Gottlieb | |
| 2010/0094496 A1* | 4/2010 | Hershkovitz | B60L 3/12 701/22 |
| 2010/0106401 A1* | 4/2010 | Naito | B60L 11/1809 701/533 |
| 2010/0138098 A1* | 6/2010 | Takahara | B60L 11/123 701/31.4 |
| 2010/0161215 A1* | 6/2010 | Karani | H04W 4/02 701/465 |
| 2010/0207772 A1 | 8/2010 | Yamamoto | |
| 2010/0280700 A1* | 11/2010 | Morgal | G06Q 10/02 701/31.4 |
| 2010/0280753 A1* | 11/2010 | Chytil | G01C 23/00 701/532 |
| 2011/0153141 A1* | 6/2011 | Beechie | B60R 16/0236 701/31.4 |
| 2011/0241905 A1* | 10/2011 | Niwa | G01C 21/3682 340/995.1 |
| 2012/0109515 A1* | 5/2012 | Uyeki | G01C 21/3469 701/423 |
| 2012/0116670 A1* | 5/2012 | Rosekrans | G01C 21/3469 701/426 |
| 2012/0179365 A1* | 7/2012 | Miyahara | G01C 21/3617 701/428 |
| 2012/0179420 A1 | 7/2012 | Gilman et al. | |
| 2012/0191289 A1 | 7/2012 | Guo et al. | |
| 2012/0253655 A1 | 10/2012 | Yamada et al. | |

FOREIGN PATENT DOCUMENTS

| | | |
|---|---|---|
| JP | 2001-112121 | 4/2001 |
| JP | 2003-121174 | 4/2003 |
| JP | 2003-294463 | 10/2003 |
| JP | 2005-198445 | 7/2005 |
| JP | 2006-112932 | 4/2006 |
| JP | 2006-115623 | 4/2006 |
| JP | 2010-259252 | 11/2010 |
| JP | 2011-232208 | 11/2011 |
| KR | 1020050024889 | 3/2005 |
| KR | 1020050035336 | 4/2005 |
| WO | WO 2011/092729 | 8/2011 |

* cited by examiner

RANGE MARKER FOR A NAVIGATION SYSTEM

CROSS REFERENCE TO RELATED APPLICATION

This application is a continuation of U.S. application Ser. No. 12/942,746 entitled "Range Marker for a Navigation System," filed on Nov. 9, 2010, now U.S. Pat. No. 9,043,134, which is hereby incorporated by reference herein in its entirety.

BACKGROUND

Field

The present disclosure relates to navigation systems operating in conjunction with motor vehicles, and more particularly relates to methods, devices and systems for displaying a range marker for a navigation system.

Description of the Related Art

Over the last decade or so, navigation systems, and in particular, those based on a Global Positioning System (GPS), have become popular and extensively used in consumer vehicles and the like. A navigation system that allows a driver to focus on the road without having to look on paper maps while driving, helps prevent a driver from getting lost, and otherwise enhances the driving experience. In typical usage, the driver or another occupant inside the vehicle inputs the destination name or address via an interface (e.g., a LCD screen) on the navigation system. Once the address is ascertained, the navigation system quickly maps out the preferred route and provides instructions verbally or displays the instructions on a map or a screen, or both. As the driver begins driving the vehicle, the navigation system may provide turn-by-turn directions, verbally instructing the driver which road to stay on, which exit to take, where to make a turn, and the like, thereby assisting the driver to more efficiently arrive at the desired destination. Should the driver not follow the instructions given, some navigation systems are now able to re-route the driver in real-time, providing an updated route and corresponding instructions.

While sophisticated, and certainly a welcome addition to vehicles, navigation systems are still not optimal. For example, consider the situation where a driver is searching for a nearby gas station as the fuel tank is approaching empty. Current navigation systems may display a plurality of gas stations, but the driver might not be able to determine which gas stations are reachable before the vehicle runs out of gas and may select a gas station that is out of range, leaving the driver stranded without gas prior to reaching the gas station. Moreover, as gas stations may be popular, a search for gas stations on the navigation unit may return too many results and may inundate the navigation screen with any and all gas stations displayable, thereby overwhelming or confusing the driver with too many displayed options. Accordingly, devices, systems and methods are needed to improve upon current navigation systems.

SUMMARY

Devices, methods and systems are disclosed herein to describe a range marker for a navigation system. The range marker (herein used interchangeably with the term "range ring") may delineate a bounded area within a navigation map that the vehicle may travel within prior to running out of gas, electricity or any other type of fuel powering the vehicle. For example, if the vehicle has enough gas left to drive 5 miles, then the range marker may be, in one embodiment, a circular ring with a radius of 5 miles since the vehicle may travel 5 miles in any direction without running out of fuel. As the fuel continues to decrease during operation of the vehicle, the range marker may become smaller and smaller indicating a shrinking range as the fuel remaining decreases. In one example, all refueling stations (e.g., gas stations, electronic depots, etc.) within the range marker may appear on the display of the navigation system, and as the location of the vehicle, the remaining fuel, and the reachable refueling stations change, the refueling stations that are out of range based on the remaining fuel may be removed from the display of the navigation system.

In one embodiment, a navigation system is hardwired to the vehicle control system. In one example, a vehicle, especially those of a newer make and model year, may include an original equipment manufacturer (OEM) navigation system. These navigation systems are integrated into the vehicle (e.g., permanently or semi-permanently attached to the central console area and might not be removable for portable use).

In another embodiment, a navigation system includes a data transmission wire, such as a universal serial bus (USB) for coupling the navigation system to the vehicle control system. The navigation system in this embodiment may be a third-party navigation system and may be portable (e.g., easily attachable or removable each time the driver enters and operates the vehicle).

In another embodiment, a navigation system includes a wireless transmitter for communication with a vehicle control system. For example, the navigation system and the vehicle control system may communicate with each other via BLUETOOTH. The navigation system in this embodiment may be a third-party navigation system and may be portable (e.g., easily attachable or removable each time the driver enters and operates the vehicle).

In another embodiment, a navigation system includes a wireless transceiver for communication with other wireless transceivers (e.g., a BLUETOOTH transceiver). However, if the vehicle does not have a wireless transceiver but has a physical interface for receiving an external input (e.g., a USB port), a physical drive with BLUETOOTH and physical connection capabilities (e.g., a USB adapter) may be used, among other functions, as an intermediary to transmit data between the navigation system and the vehicle. The navigation system and the physical drive in this embodiment may be third-party systems and may be portable (e.g., easily attachable or removable each time the driver enters and operates the vehicle).

In another embodiment, the physical devices and systems described herein may perform the following method. First, the navigation system may receive an input to display nearby refueling stations. Next, the navigation system may obtain information from the vehicle indicating the distance that the vehicle is estimated to be able to travel before running out of fuel ("distance to empty"). Based on the distance to empty information, the navigation system may determine a size of the ring marker and the refueling stations within the ring marker. The navigation system may then display the ring marker and refueling stations. As the vehicle is operated and fuel is consumed and reduced, the navigation system may decrease the area bounded by the ring marker and remove the refueling stations outside the ring marker if they are no longer within driving range of the vehicle. After the driver refuels the vehicle, the ring marker and refueling stations may be removed and the navigation system may revert back to normal operation mode.

In yet another embodiment, the physical devices and systems described herein may perform the following method. The navigation system may be operating in a standard mode. Once the distance to empty is below a certain threshold (e.g., 10 miles, 1 gallon of fuel remaining, 30 minutes of charge remaining, etc.), the navigation system may activate a range ring mode, which adds a range marker or range ring delineating the outside boundary of the range of travel based on the amount of fuel or charge left. The navigation system may also display the refueling or recharging stations within the boundary. As the vehicle continues to consume fuel or battery power, the range marker may get smaller and smaller until the vehicle is refueled or recharged. After the vehicle is refueled or recharged and the distance to empty is above the threshold, normal operation of the navigation system is resumed.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
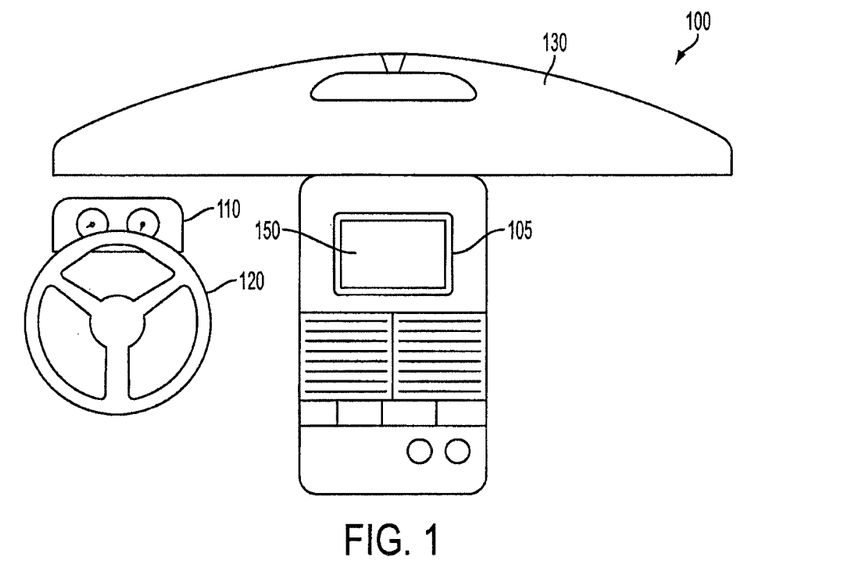
FIG. 1 depicts an integrated navigation system within a vehicle according to one or more embodiments described herein.

Turning to FIG. 1, an integrated navigation system within a vehicle is shown. Here, a vehicle interior 100 is depicted to include an integrated navigation unit 105 with a display portion 150 located at a central console area adjacent to the instrumentation gauges 110 and the steering wheel 120 and beneath the windshield 130. The navigation unit 105 may be controlled by a driver by using any of a plurality of input systems. For example, the navigation unit 105 may have a touch screen for accepting user input by way of tactile contact or a microphone for accepting user input by way of verbal commands. The integrated navigation unit 105 may also be coupled to or in communication with a vehicle control system via wiring (not shown) and thereby able to obtain information related to the status of the vehicle, including how much fuel is left (e.g., remaining gallons of gas or remaining level of electricity or charge, etc.), the make and model of the car, the estimated fuel efficiency of the car, how many miles the vehicle is estimated to be able to travel prior to running out of fuel or charge based on current fuel levels or charge levels and the like. In one embodiment, the navigation unit 105 may receive information from the vehicle control system and further process the information to display or audibly output the information (and/or derivative information) to the user. For example, the navigation unit 105 may receive information such as a fuel level (e.g., 1 gallon of gas remaining) and estimated vehicle fuel efficiency (e.g., 30 miles per gallon) from the vehicle control system and may calculate a "distance-to-empty" (e.g., by taking the gallon of gas remaining and multiplying it by the estimated fuel efficiency). After calculating the "distance-to-empty," the navigation unit 105 may display and/or audibly provide this information to the driver.

Figure 2:
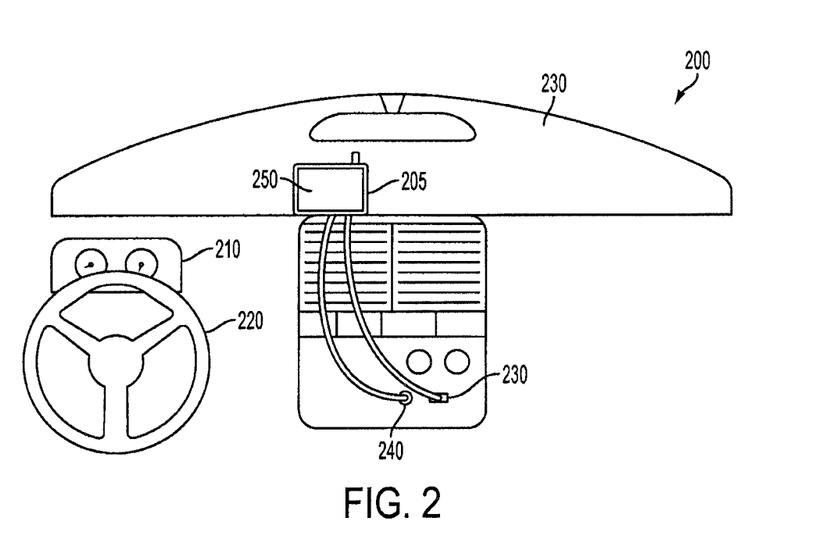
FIG. 2 depicts a third-party navigation system in communication with a vehicle according to one or more embodiments described herein.

FIG. 2 illustrates a vehicle interior 200 without an integrated navigation unit 105. Here, the navigation unit 205 may be a third-party device attachable (via a suction plate) to a vehicle windshield 230. As shown, the navigation unit 205 may include a display 250 and may draw power from a power source 240 found in the vehicle. Further, the navigation unit 205 may be connected to a universal serial bus (USB) port 230 in communication with the vehicle control system. As shown, the placement of the navigation unit 205 may be such that a driver may view and/or reach the navigation unit 205, namely near the steering wheel 220 and the instrument gauges 210. Similar to the navigation unit 105, the navigation unit 205 may be controlled by a driver by using any of a plurality of input systems. For example, the navigation unit 205 may have a touch screen for accepting user input by way of tactile contact or a microphone for accepting user input by way of verbal commands. The navigation unit 205 may be coupled to or in communication with a vehicle control system via the USB connection and thereby able to obtain information related to the status of the vehicle, including how much fuel or charge is left (e.g., remaining gallons of gas or remaining level of electricity, etc.), the make and model of the car, estimated fuel efficiency of the car, how many miles the vehicle is estimated to be able to travel prior to running out of fuel based on current fuel levels and the like. For example, the navigation unit 205 may receive information such as a fuel level (e.g., 1 gallon of gas remaining) and estimated vehicle fuel efficiency (e.g., 30 miles per gallon) from the vehicle control system and may calculate a "distance-to-empty" (e.g., by taking the gallon of gas remaining and multiplying it by the estimated fuel efficiency). After calculating the "distance-to-empty," the navigation unit 205 may display and/or audibly provide this information to the driver.

Regardless of whether the navigation units 105 and 205 or any other navigation unit is utilized, the navigation unit (e.g., navigation unit 105 or 205) may further determine a range marker based on the "distance-to-empty" and may display the range marker on the navigation unit. Additionally, the navigation unit may display nearby refueling stations in relationship to the range marker.

Figure 3:
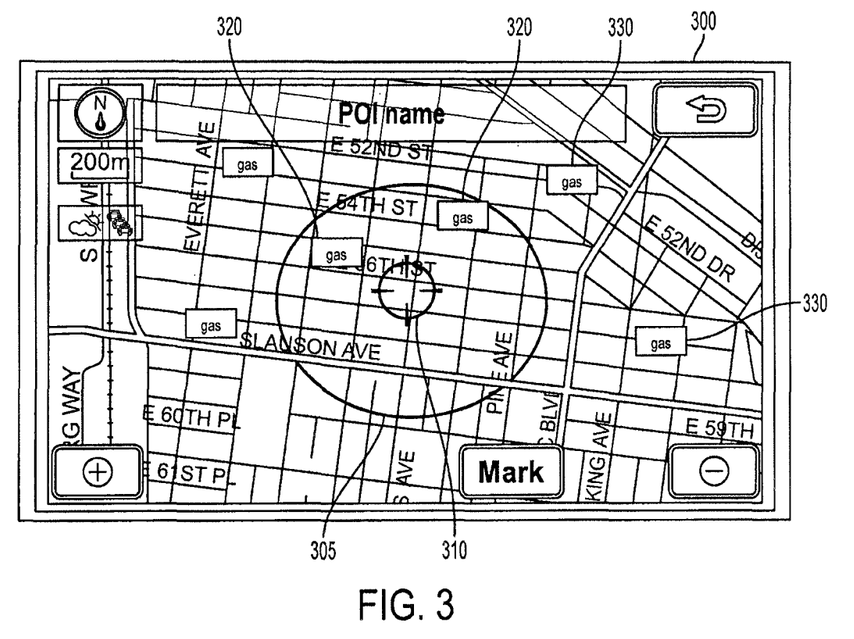
FIG. 3 illustrates an example of a screenshot of a navigation display with a range marker and gas stations according to one or more embodiments described herein.

FIG. 3 illustrates an example of a screenshot of a navigation unit display 300 (e.g., display 150 or 250 of navigation unit 105 or 205, respectively) with a range marker 305. As shown, the range marker 305 may include a center "target" 310. The target 310 may be the current location of the vehicle, shown substantially at the center of the range marker 305. In this example, the range marker 305 may have a radius equivalent to roughly 500 meters based on the scale shown at the upper left hand corner of the display (e.g., showing the distance for 200 meters). In other words, the range marker 305 indicates that the vehicle has enough gas remaining to travel 500 meters and which gas stations may be reachable before the gas runs out (i.e., gas stations within 500 meters). Gas stations 320 are shown inside the perimeter of the range marker 305 and are estimated to be reachable by the vehicle before the gas is exhausted, whereas gas stations 330 are outside the perimeter of the range marker 305 and are estimated to be unreachable by the vehicle before the gas is exhausted. By quickly glancing at the navigation display 300, a driver may easily ascertain an appropriate gas station, the location of the vehicle in relationship to the gas station and the direction of the gas station. Equally important, the driver may ascertain which gas stations may be outside the range of the vehicle based on the remaining fuel levels thereby avoiding those gas stations. In addition, the navigation display 300 may be configured such that the driver may tap on either of the gas stations marked 320 to obtain turn by turn directions to reach the selected gas station. In one embodiment, the range marker 305 may be formed in the shape of a square, for example, because the roads the vehicle is estimated to travel on are oriented in a square or grid-shaped configuration.

Figure 4:
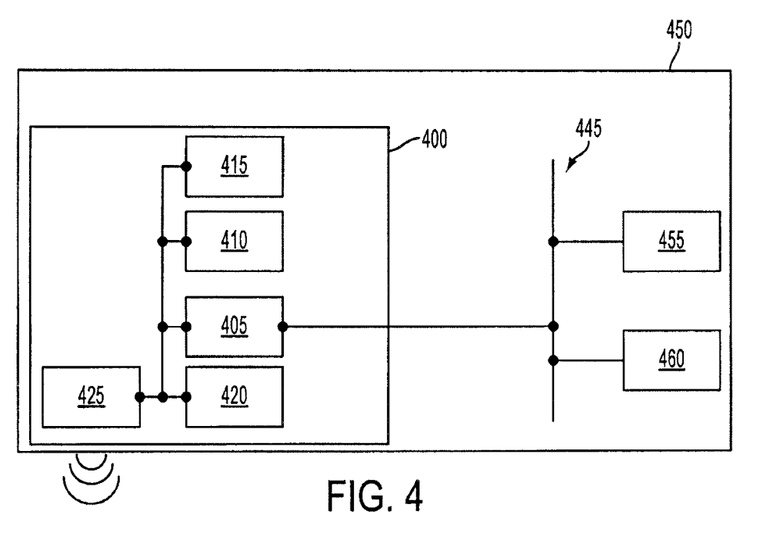
FIG. 4 depicts a block diagram of a navigation system in communication with a vehicle according to one or more embodiments described herein.

FIG. 4 illustrates a block diagram of an integrated navigation system (e.g., navigation unit 105 as shown in FIG. 1). As depicted, the navigation unit 400 may be connected to the control system of the vehicle 450. In one example, the control system of the vehicle 450 includes a Controller Area Network (CAN) bus 445. The CAN bus 445 is a vehicle bus standard designed to allow microcontrollers and devices to communicate with each other within a vehicle. More particularly, the CAN bus 445 is a multi-master broadcast serial bus standard for connecting electronic control units (ECUs). A modern automobile may have as many as 70 ECUs for various subsystems. For example, ECUs may be used for controlling the turn signals, in addition to other vehicle systems such as the transmission, airbags, antilock braking, cruise control, audio systems, windows, doors, mirror adjustment, etc. Of particular significance, one or more ECUs may provide information such as the fuel remaining, fuel efficiency (e.g., miles per gallon, etc.) and/or distance-to-empty information.

In this embodiment, the navigation system 400 may be an integrated, OEM navigation system installed at, for example, the front central console area of the vehicle between the driver and the front passenger seat. However, the actual location of the navigation system 400 may be anywhere inside the vehicle. For example, the navigation system 400 may be integrated into the instrument display panel behind the steering wheel or dropped down from the ceiling area of the vehicle. The navigation system 400 may include a processor 405, an input-output interface 410, a route-determination unit 415, a memory 420 and a transceiver 425. For simplicity, the navigation system 400 may be considered one such ECU connected to the CAN bus 445, and may communicate with other ECUs via the CAN bus 445.

The input-output interface 410 may be, for example, a LCD touch screen input that a user may press to input commands and destination addresses into the navigation system 400. In one embodiment of the operation of the navigation system 400, the processor 405 may receive a destination address from the I/O interface 410 and may receive a current location from the transceiver 425 communicating with, for example, a GPS satellite to determine the exact location of the vehicle. Next, the processor 405 may obtain a map from the memory 420 and may provide the current location, the destination and a map to the route calculation unit 415 for determination of the preferred route. Once the route is calculated, the processor 405 may provide the route information to the I/O interface 410 for display and/or verbal output to the driver. As the vehicle moves, the navigation system 400 may track the route and the exact location of the vehicle in order to provide real-time turn-by-turn directions.

As shown in FIG. 4, the processor 405 may be coupled to the CAN bus 445 to communicate with any number of other ECUs, such as a vehicle status information unit 455 or an engine control unit 460. In one embodiment, electrical control signals generated by the processor 405 may be directly sent to the vehicle status information unit 455 to obtain information such as the remaining fuel in the vehicle, the fuel efficiency of the vehicle and/or the distance-to-empty. Alternatively, the electrical control signals generated by the processor 405 may be sent to a general control unit, such as the engine control unit 460, which in turn, processes the electrical control signals and provides the requested information or sends a subsequent signal(s) to a different ECU to obtain the requested information. The requested information may be sent to the navigation system 400 via the CAN bus 445. Once received by the navigation system 400, the processor 405 may perform calculations (if needed) or may utilize the distance-to-empty information to generate a range marker with a radius equivalent to the distance-to-empty. That is, the range marker may be a circular boundary illustrating the areas that the vehicle may travel before running out of fuel. The navigation system 400 may also obtain refueling station information from the memory 420 and display the refueling stations that are within the circular boundary, thereby informing the driver which stations are within range and may be reachable before the vehicle runs out of fuel. In this manner, the driver may be able to quickly and accurately obtain fuel before running out and being inconvenienced as a result of running out of fuel.

In one embodiment, after the refueling stations are displayed within the range marker, the driver may select one of the refueling stations, and in response, the processor 405 may obtain new directions from the route-calculation unit 415 and display and/or communicate the new directions as a detour point for the driver.

Figure 5:
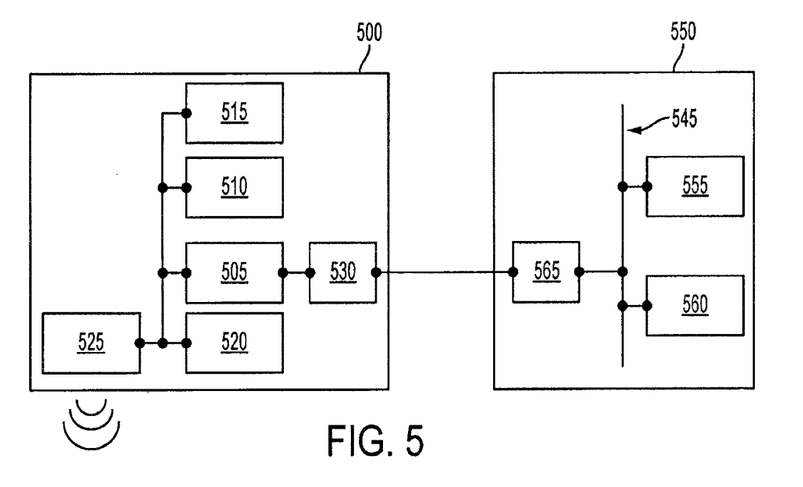
FIG. 5 depicts a block diagram of a navigation system in communication with a vehicle according to one or more embodiments described herein.

Turning to FIG. 5, a navigation system 500 as depicted may be connected to a control system 550 of a vehicle. In one example, the control system 550 may include a CAN bus 545. In this embodiment, the navigation system 500 may be a portable, third-party navigation system usable by the driver inside or outside the vehicle. When utilized to provide turn-by-turn directions for the vehicle, the navigation system 500 may be, in one example, attached to the dash board or the inside of the windshield of the vehicle (e.g., as shown by navigation unit 200 of FIG. 2). The navigation system 500 may include a processor 505, an input-output interface 510, a route-determination unit 515, a memory 520 and a transceiver 525. The navigation system 500 may further include a port 530 for connecting the navigation system 500 to a port 565 of the control system 550 of the vehicle. The ports 530 and 565 may be, in one example, USB compliant and may be coupled to each other by using a USB cable. For simplicity, the navigation system 500 may be considered by the control system 550 of the vehicle as an ECU when connected to the CAN bus 545 via the USB port 565, and may communicate with other ECUs via the CAN bus 545. While the USB cable is described in this particular example, any known connection cable for transmitting and receiving data may be used such as a coaxial cable, a fire wire cable and the like.

The processor 505, the input-output interface 510, the route calculation unit 515, the memory 520 and the transceiver 525 of the navigation system 500 may operate in a similar fashion as the processor 405, the input-output interface 410, the route calculation unit 415, the memory 420 and the transceiver 425 of the navigation system 400. The main difference is the inclusion of the port 530 used to interface with the control system 550 of the vehicle.

Similarly, the CAN bus 545, the vehicle status information unit 555 and the engine control unit 560 may operate generally like the CAN bus 445, the vehicle status information unit 455 and the engine control unit 460 as described in correspondence with FIG. 4. The main difference is the inclusion of the port 565 used to interface with the navigation system 500. Notably, by allowing the navigation system 500 to communicate with the control system 550 of the vehicle, functionality is significantly enhanced. For example, older-generation navigation systems may now be retro-fitted for certain vehicles thereby allowing a driver to continue to use an older generation navigation system, which might not have been originally designed to provide such features.

Figure 6:
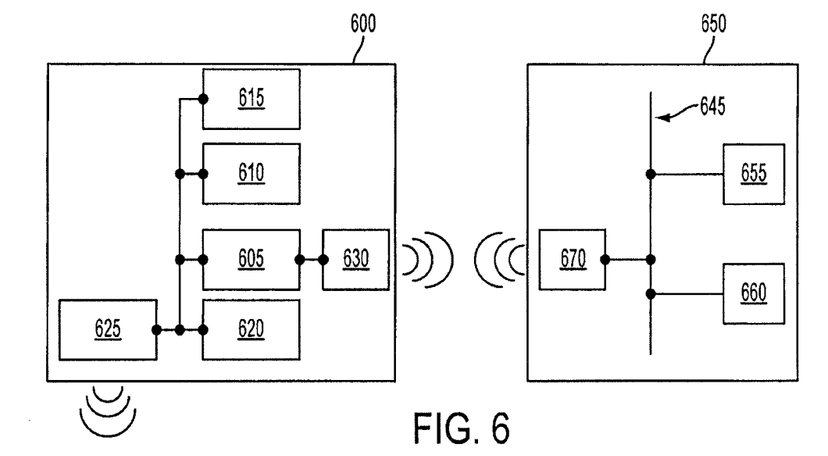
FIG. 6 depicts a block diagram of a navigation system in communication with a vehicle according to one or more embodiments described herein.

Turning to FIG. 6, a navigation system 600 as depicted may be connected to a control system 650 of a vehicle. In one example, the control system 650 of the vehicle includes a CAN bus 645. In this embodiment, the navigation system 600 may be a portable, third-party navigation system usable by the driver inside or outside the vehicle. When utilized to provide turn-by-turn directions for the vehicle, the navigation system 600 may be, in one example, attached to the dash board or the inside of the windshield of the vehicle. The navigation system 600 may include a processor 605, an input-output interface 610, a route-determination unit 615, a memory 620 and a transceiver 625. The navigation system 600 may further include a wireless communication adapter 630 for connecting the navigation system 600 to a wireless communication adapter 670 of a vehicle control system 650. The adapters 630 and 670 may be, in one example, BLUETOOTH-compliant and may be coupled to each other wirelessly as long as both devices are within communication range. For simplicity, the navigation system 600 may be considered by the vehicle control system 650 as an ECU when connected to the CAN bus 645 wirelessly via BLUETOOTH adapter 670, and may communicate with other ECUs via the CAN bus 645. While BLUETOOTH is described in this particular example, any known wireless transmission system for transmitting and receiving data may be used.

The processor 605, the input-output interface 610, the route calculation unit 615, the memory 620 and the transceiver 625 of the navigation system 600 may operate in a similar fashion as the processor 405, the input-output interface 410, the route calculation unit 415, the memory 420 and the transceiver 425 of the navigation system 400. The main difference is the inclusion of the wireless communication adapter 630 used to interface with the vehicle control system 650.

Similarly, the CAN bus 645, the vehicle status information unit 655 and the engine control unit 660 may operate generally like the CAN bus 645, the vehicle status information unit 455 and the engine control unit 460 as described in correspondence with FIG. 4. The main difference is the inclusion of the wireless communication adapter 670 used to interface with the navigation system 600. Notably, by allowing the navigation system 600 to communicate with the vehicle control system 650, functionality is significantly enhanced. For example, older-generation navigation systems may now be retrofitted for use in certain vehicles, thereby allowing a driver to continue to use an older generation navigation system which might not have been originally designed to provide such features. In addition, where the navigation system and the vehicle control system have both wired and wireless communication systems (e.g., USB and BLUETOOTH capabilities), a redundant system may be achieved and utilized such that the features described herein may be achievable even if one of the connections becomes lost (e.g., the USB cable becomes disconnected).

Figure 7:
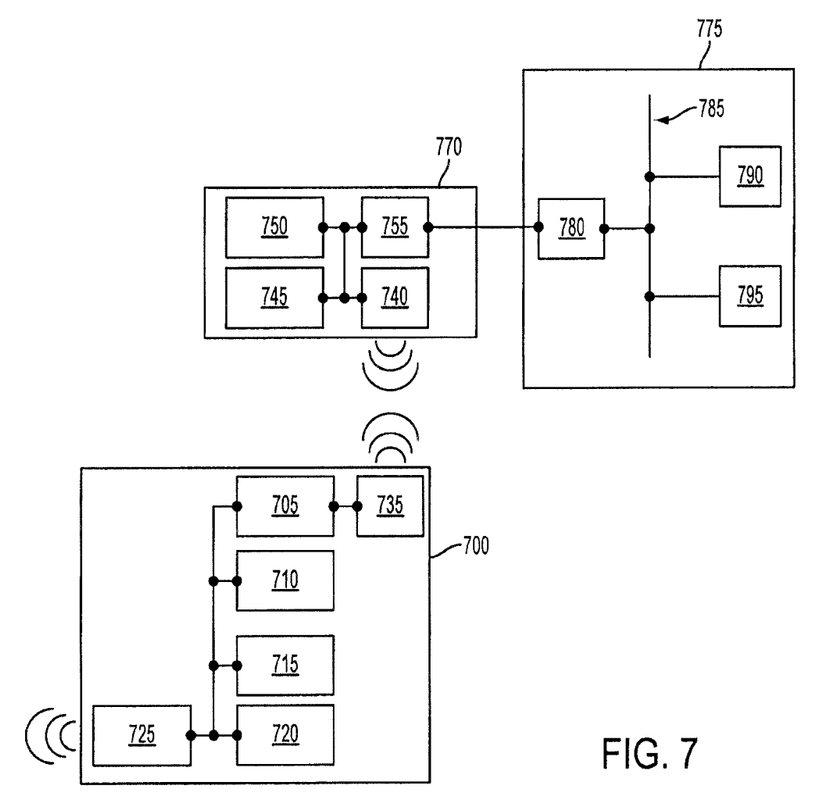
FIG. 7 depicts a block diagram of a navigation system in communication with a vehicle according to one or more embodiments described herein.

Turning to FIG. 7, a navigation system 700 as depicted may be configured to connect wirelessly to a physical drive 770, which in turn, may be connected to a control system 775 of a vehicle. In one example, the physical drive 770 may be a thumb drive or a flash drive. In this embodiment, the navigation system 700 may be a portable, third-party navigation system usable by the driver inside or outside the vehicle. When utilized to provide turn-by-turn directions for the vehicle, the navigation system 700 may be, in one example, attached to the dash board or the inside of the windshield of the vehicle. The navigation system 700 may include a processor 705, an input-output interface 710, a route-determination unit 715, a memory 720 and a transceiver 725. The navigation system 700 may further include a wireless communication adapter 735 coupled to the processor 705. In one embodiment, the wireless communication adapter 735 allows the navigation system 700 to communicate wirelessly with a wireless communication adapter 740 of the physical drive 770. The adapters 735 and 740 may be, in one example, BLUETOOTH-compliant and may be coupled to each other wirelessly as long as both devices are within communication range. In addition to the wireless communication adapter 740, the physical drive 770 may include a processor 745, a memory 750 and a wired connection interface port 755. As shown in FIG. 7, a vehicle control system 775 may include a wired connection interface port 780, a CAN bus 785, a vehicle status information unit 790 and an engine control unit 795. The ports 755 and 780 may be, in one example, USB compliant and may be coupled to each other by using a USB cable.

For simplicity, the navigation system 700 may be viewed by the vehicle control system 775 as an ECU when in wireless communication with the physical drive 770 if the physical drive 770 is connected to the vehicle control system 775. In one embodiment, the navigation system 700 may communicate with the vehicle control system 775 via the physical drive 770. In other words, the physical drive 770 may function as a communication medium for transmitting data between the navigation system 700 and the vehicle control system 775. As discussed above, other communication mediums, both wired and wireless may be substituted for the BLUETOOTH and USB communication systems described.

The processor 705, the input-output interface 710, the route calculation unit 715, the memory 720 and the transceiver 725 of the navigation system 700 may operate in a similar fashion as the processor 405, the input-output interface 410, the route calculation unit 415, the memory 420 and the transceiver 425 of the navigation system 400. The main difference is the inclusion of the wireless communication adapter 735 used to interface with the physical drive 770.

Similarly, the CAN bus 785, the vehicle status information unit 790 and the engine control unit 795 may operate generally like the CAN bus 745, the turn signal control unit 755 and the engine control unit 760, respectively, as described in correspondence with FIG. 7. The main difference is the inclusion of the port 780 used to interface with the physical drive 770. Notably, by allowing both the navigation system 700 and the vehicle control system 775 to communicate with the physical drive 770, functionality is significantly enhanced. For example, older-generation navigation systems may now be retro-fitted for certain vehicles thereby allowing a driver to continue to use an older generation navigation system, which might not have been originally designed to provide such features. Moreover, the older generation navigation system does not even need to be able to connect or communicate directly with the vehicle control system. Instead, these seemingly incompatible systems may now interface and communicate with one another via a physical drive such as a thumb drive.

While the following descriptions will use the navigation system 500 of FIG. 5 as an example, any of the navigation systems disclosed herein may be configured to perform the methods described. In other words, any of the methods described herein (e.g., as shown in FIGS. 8-9) may be performed by any of the systems described herein (e.g., as shown in FIGS. 1, 2 and 4-7).

Figure 8:
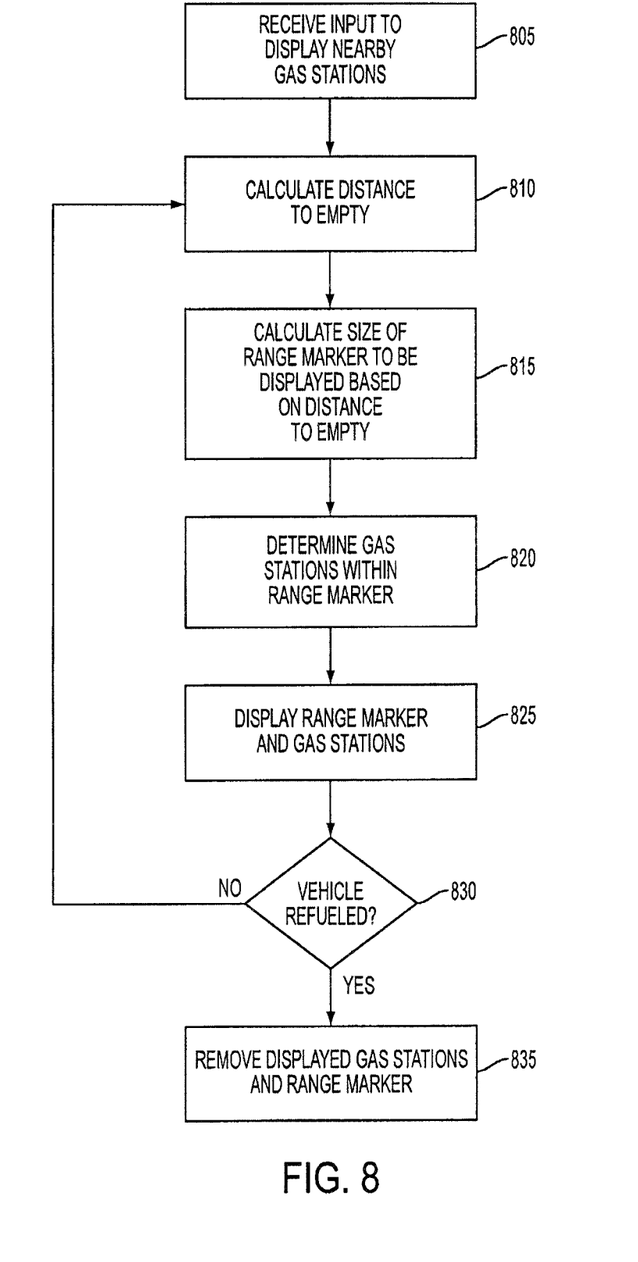
FIG. 8 illustrates an example of a flowchart describing an operation of a navigation system according to one or more embodiments described herein.

FIG. 8 is a flowchart illustrating one method of generating a range marker or range ring for a navigation unit. At step 805, the navigation unit 500 may receive input from the driver or passenger to display nearby gas stations. At step 810, the navigation unit 500 may request vehicle fuel information from the vehicle system 550. For example, the navigation unit 500 may request fuel level information, fuel efficiency information and/or distance-to-empty information. Here, at step 810, the navigation unit 500 may use processor 205 to calculate the distance-to-empty information from the fuel level remaining and the fuel efficiency information or may simply utilize the distance-to-empty information if received from the vehicle system 550. At step 815, the processor 205 may calculate the size of the range marker based on the distance-to-empty information. For example, if the distance-to-empty is two miles, that is, the vehicle is estimated to be able to travel two miles before running out of gas, the size of the range marker may be a two mile radius (and scaled accordingly to fit on the navigation map) since the vehicle may theoretically travel two miles in any direction before running out of gas. At step 820, any gas stations within the range marker (and therefore, reachable by the vehicle before running out of gas) may be retrieved by the memory 520, which may be configured to store gas station location information. At step 825, the range marker and gas stations may be displayed on the display portion 150 to the user. Next, the navigation unit 500 determines whether the vehicle has been refueled by requesting fuel level information from the vehicle control system 550. If so, the range marker and/or gas stations may be removed from the display portion 150 of the navigation unit 500. Otherwise, the method moves to step 810 again where an updated distance-to-empty may be re-calculated. Until the vehicle is refueled, steps 810-825 may be repeated, and accordingly, as the distance-to-empty is reduced, the radius of the range marker may be reduced in a corresponding fashion along with the removal of any gas stations which may no longer be in range.

Figure 9:
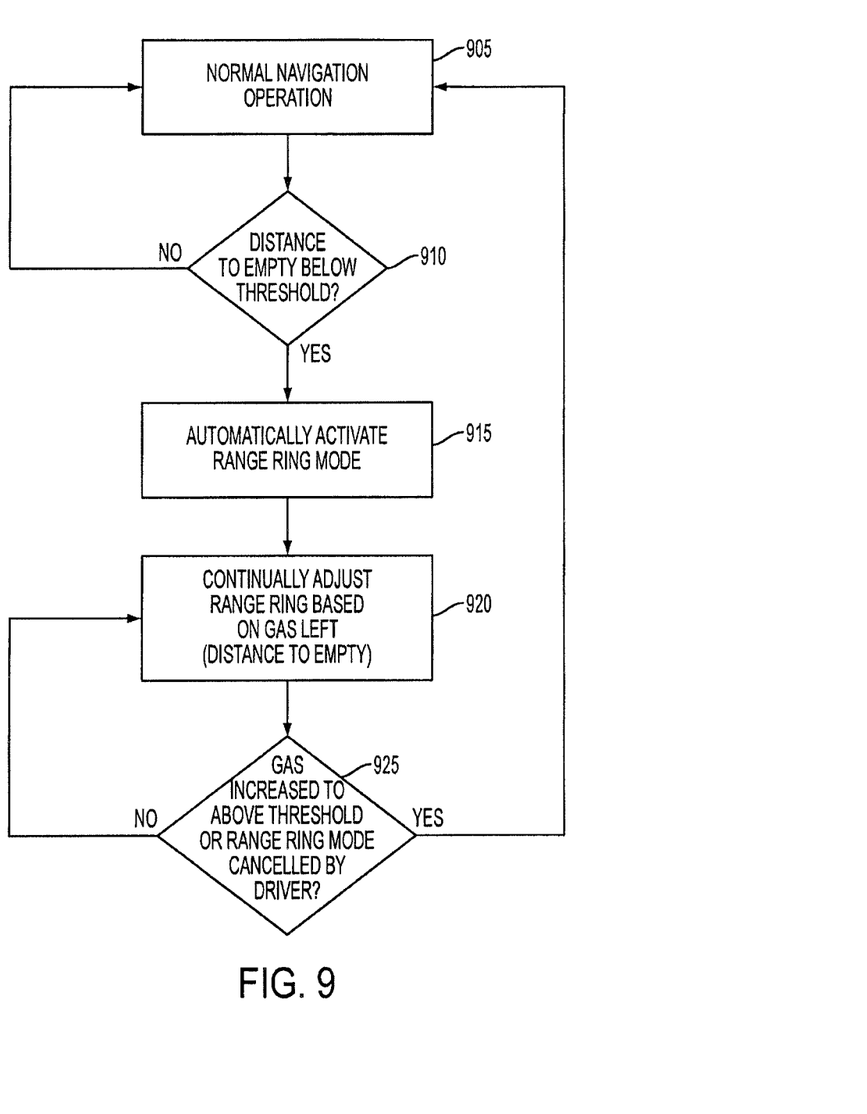
FIG. 9 illustrates an example of a flowchart describing an operation of a navigation system according to one or more embodiments described herein.

FIG. 9 depicts another method of operation of the navigation unit (e.g., navigation unit 500). Here, normal operation of the navigation unit is active at step 905. At step 910, the navigation unit 500 may receive information from the vehicle control system 550 that a distance-to-empty is below a threshold. The threshold may be, for example, any distance between 0.1 miles-50 miles and may be customizably adjustable by the driver based on when the driver would like to be alerted of low gas. Once the navigation unit 500 receives information from the vehicle control system that the distance-to-empty is below a threshold (e.g., less than 1 gallon of gas left or 5 miles to empty), a range ring mode may be activated in step 915. At step 920, the navigation unit 500 may continually adjust in real-time the range ring and the gas stations within range based on the distance-to-empty. In the range ring mode, the control system may automatically display the range marker 305 and the gas station icons within the range marker 305 on the map when the distance-to-empty is below the threshold. The performance of step 920 may be similar to steps 810-825 of FIG. 8. Next, at step 925, if the gas or fuel is replenished above the threshold or if the ring mode is cancelled by the driver or passenger, the method reverts back to step 905 and a normal navigation mode is activated. Otherwise, step 920 is re-performed and the navigation unit 500 may continually adjust in real-time the range ring and the gas stations within range based on the distance-to-empty.

In one embodiment, the threshold may be the density of gas stations within the distance-to-empty. For example, the range ring mode may be triggered if only one gas station remains within the radius of the distance-to-empty. That is, when the navigation system detects that the remaining fuel is estimated to allow the vehicle to reach only one gas station before running out, the range ring mode may be activated. Additionally, an audio message may be played to the driver to alert the driver that only one gas station remains in range. Also, the range ring may include two concentric range rings (one slightly larger the other) indicating that only one gas station remains in the range. The driver may be prompted to input a "yes" or "no" to a query offering to divert the driver from his or her original destination to the remaining gas station.

In another embodiment, when the range ring mode is activated at step 915 of FIG. 9, an audible message may be played to the driver and passengers to explain the range ring mode and allow the driver or passengers to set course for a gas station on the screen.

Figure 10:
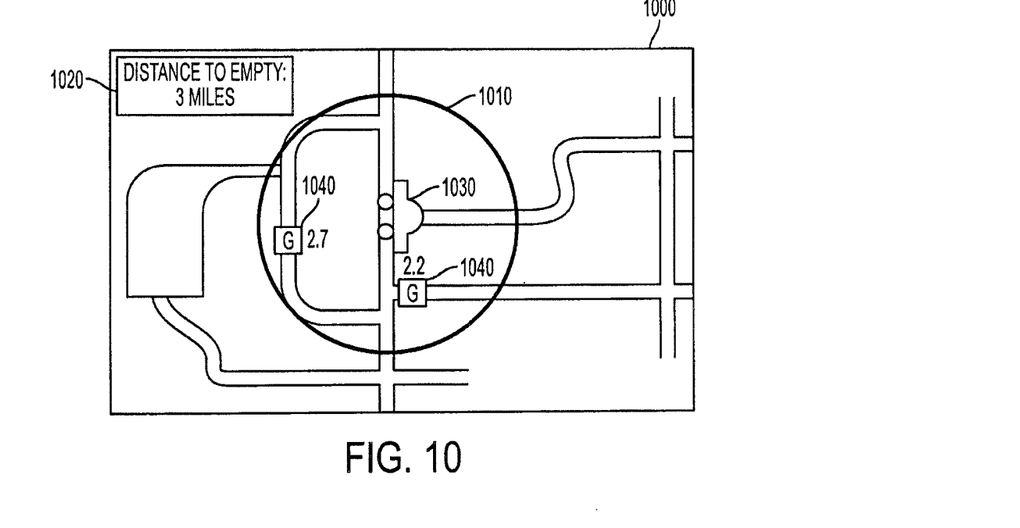
FIG. 10 illustrates a screenshot of a navigation display with a range marker and gas stations according to one or more embodiments described herein.
Figure 11:
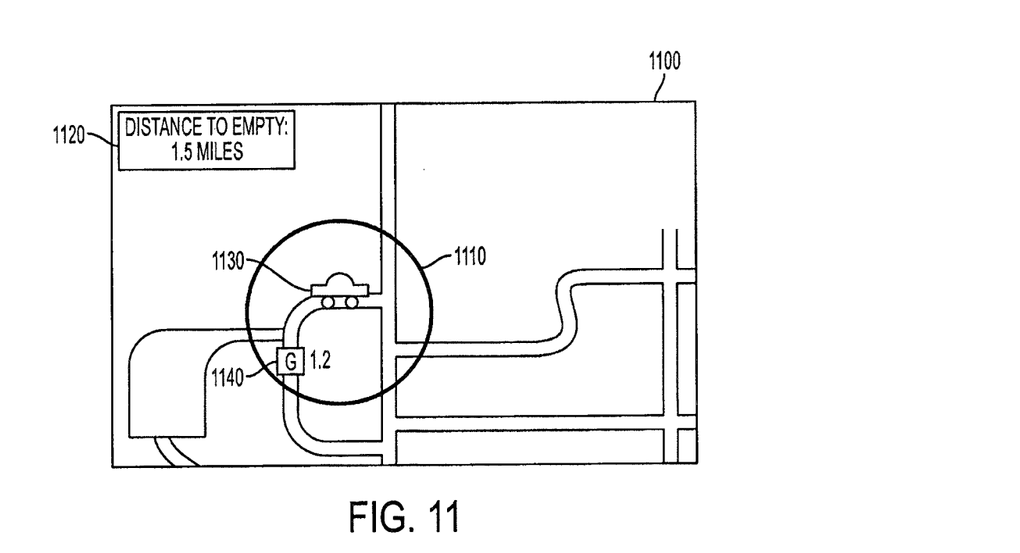
FIG. 11 illustrates a screenshot of a navigation display with a range marker and a gas station according to one or more embodiments described herein.
Figure 12:
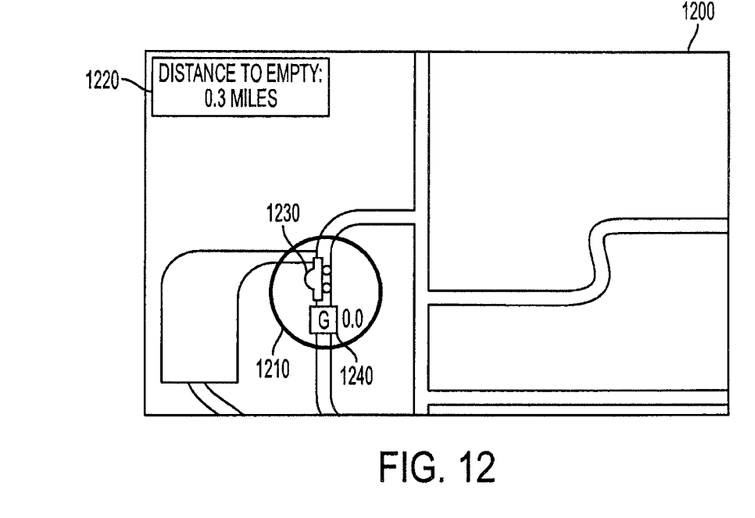
FIG. 12 illustrates a screenshot of a navigation display with a range marker and a gas station according to one or more embodiments described herein.

FIGS. 10-12 illustrate an example of different screenshots that may be related to the operation of the navigation system as described in FIGS. 8 and 9. FIG. 10 illustrates a navigation display 1000 with range ring 1010. Here, the range ring 1010 has a radius of 3 miles since the distance-to-empty information as shown in box 1020 is 3 miles. The current location of the vehicle 1030 is shown in relationship to the reachable gas stations 1040, which are 2.7 miles and 2.2 miles away, respectively. In this figure, no gas stations outside the range ring 1010 are shown even if they exist since they are outside the reach of the vehicle. The distance to each gas station is also shown adjacent to the gas station icon. This allows the driver to determine which gas station is the closest to the current position of the vehicle.

FIG. 11 illustrates a navigation display 1100 with range ring 1110. FIG. 11 may depict a continuation of the situation shown in FIG. 10. Here, the range ring 1010 has been reduced from a radius of 3 miles to a radius of 1.5 miles since the vehicle has traveled an additional 1.5 miles. More particularly, as compared to FIG. 10, the size of the range ring 1110 has been reduced and one of the gas stations shown in FIG. 10 is now out of range and removed. The distance to the remaining gas station has also been updated (e.g., from 2.7 miles to 1.2 miles).

FIG. 12 illustrates a navigation display 1200 with range ring 1210. FIG. 12 may depict a continuation of the situations shown in FIGS. 10 and 11. Here, the range ring 1210 has been reduced from a radius of 3 miles (as shown in FIG. 10) to a radius of 0.3 miles since the vehicle has traveled an additional 2.7 miles. More particularly, as compared to FIGS. 10 and 11, the size of the range ring 1210 has been further reduced and the distance to the remaining gas station has also been updated (e.g., from 2.7 miles to 0.0 miles) as the vehicle has arrived at the gas station.

Figure 13:
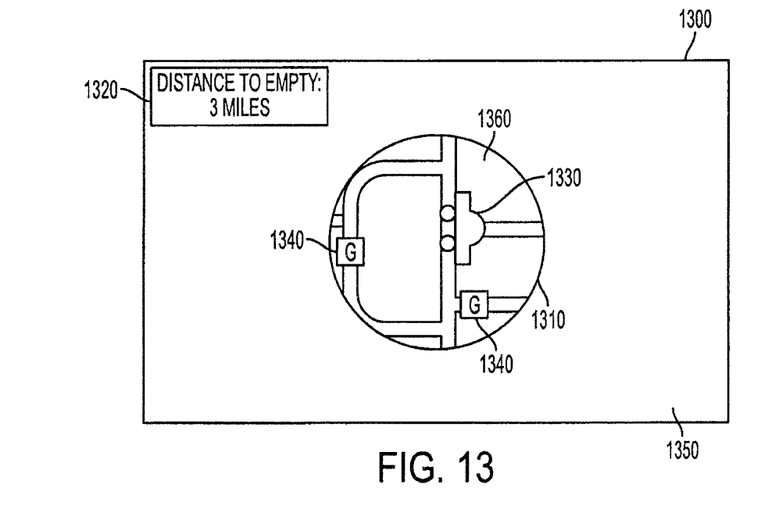
FIG. 13 illustrates a screenshot of a navigation display with a range marker and gas stations according to one or more embodiments described herein.

FIG. 13 depicts an alternative embodiment of the operation of the navigation system as described in FIGS. 8 and 9. FIG. 10 illustrates a navigation display 1300 with the range ring 1310. Here, the range ring 1310 has a radius of 3 miles since the distance-to-empty information as shown in box 1320 is 3 miles. The current location of the vehicle 1330 is shown in relationship to the reachable gas stations 1340. In this figure, only the area inside the range ring 1360 is visible, while the area outside the range ring 1350 is blacked out or otherwise left blank to further alert the driver that the vehicle is low on gas and serves as an additional visual alert that the driver is advised to drive the vehicle to a within-range gas station 1340 for refueling the vehicle.

In another embodiment, non-circular range markers may be used (not shown). Under this example, the range marker may be overlayed only on drivable roads since a circular range marker may include certain areas (e.g., grass, body of water, etc.) that might not be traversable by a traditional land vehicle. Accordingly, the result of the range marker may not be a circular ring.

In yet another embodiment, if no gas stations are found within the range marker or if the last remaining gas stations within the range marker are no longer within range (e.g., due to the driver using up additional gas because of mis-turns or if the estimate of the gas remaining is inaccurate), the navigation system (e.g., navigation unit 500) may send a signal to the vehicle control system (e.g., vehicle control system 550) to automatically send out a SOS signal or otherwise call a vehicle concierge system (e.g., OnStar, LexusLink, etc.) to request customer representative assistance. In this manner, the customer representative may arrange a tow truck or other service representative to bring the vehicle gas before the vehicle runs out of gas or shortly after, thereby cutting down on the time it would normally take for a customer to receive gas. Normally, the customer would only call for help and arrange for the delivery of gas after the vehicle has run completely out of gas.

While the disclosure primarily uses gas stations as an example, other fueling stations such as electricity depots for electric cars and the like are within the scope of the invention.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A navigation unit for a vehicle, comprising:
a navigation unit processor configured to:
receive or determine a current location of the vehicle and vehicle energy data indicating at least one of remaining fuel or electrical energy for the vehicle,
determine a distance-to-empty value based on the vehicle energy data, and
determine range marker data based on the distance-to-empty value, the range marker data indicating a boundary on a navigation map where the vehicle can travel to from the current location of the vehicle using the remaining fuel or electrical energy;
a memory communicatively coupled to the navigation unit processor, the memory configured to retrieve a location of an energy station within the boundary on the navigation map; and
a display communicatively coupled to the navigation unit processor, and configured to:
display the boundary on the navigation map and the energy station, and
iteratively update the display of the boundary on the navigation map based on an updated current location of the vehicle and an updated distance-to-empty value.

2. The navigation unit of claim 1, wherein the navigation unit processor is configured to set a current navigation display mode to a range marker mode in response to determining that the distance-to-empty value is equal to or less than a threshold value, and
wherein when or after the current navigation display mode is set to the range marker mode, the navigation unit processor is configured to determine or update the range marker data, retrieve from the memory the location of the energy station, and the display is configured to display the boundary on the navigation map and the energy station.

3. The navigation unit of claim 1, wherein the navigation unit processor is configured to determine a count of energy stations within the boundary on the navigation map, and set a current navigation display mode to a range marker mode in response to determining that the count of energy stations within the boundary on the navigation map is equal to or less than a threshold value, and
wherein when or after the current navigation display mode is set to the range marker mode, the navigation unit processor is configured to determine or update the range marker data, retrieve from the memory the location of the energy station, and the display is configured to display the boundary on the navigation map and the energy station.

4. The navigation unit of claim 1, wherein the navigation unit processor is configured to:
determine a count of energy stations within the boundary on the navigation map, and
wirelessly transmit a signal to a remotely located computer-based system when the count of energy stations is zero.

5. The navigation unit of claim 1, wherein the display is configured to display only an area within the boundary on the navigation map in a first display mode or theme, and display the area within the boundary on the navigation map and other areas outside the boundary on the navigation map in a second display mode or theme for focusing attention of a driver of the vehicle on the displayed boundary on the navigation map and the energy station.

6. The navigation unit of claim 1, wherein parts of the navigation map other than those within the boundary on the navigation map are removed from a display screen of the display for focusing attention of a driver of the vehicle on the displayed boundary on the navigation map and the energy station.

7. The navigation unit of claim 1, wherein the navigation unit processor is an electronic control unit communicatively coupled to the display and one or more electronic control units of the vehicle.

8. The navigation unit of claim 1, further comprising:
an input/output (I/O) interface communicatively coupled to the navigation unit processor, the I/O interface configured to receive an input from a user to re-route the navigation unit to include turn-by-turn directions for leading the user to the location of the energy station within the boundary on the navigation map; and
a route determination unit communicatively coupled to the I/O interface, the route determination unit configured to re-calculate turn-by-turn directions for leading the user to the location of the energy station within the boundary on the navigation map,
wherein the display is further configured to output the turn-by-turn directions for leading the user to the location of the energy station within the boundary on the navigation map.

9. The navigation unit of claim 1, wherein the energy station is at least one of a gas station or a station providing electricity to electric vehicles.

10. A navigation system for a vehicle, the navigation system comprising:
a vehicle electronic control unit configured to:
receive or determine vehicle energy data indicating at least one of remaining fuel or electrical energy for the vehicle, and
determine a distance-to-empty value based on the vehicle energy data; and
a navigation unit communicatively coupled to the vehicle electronic control unit and having a display, the navigation unit configured to:
receive or determine a current location of the vehicle,
receive the distance-to-empty value from the vehicle electronic control unit,
generate range marker data based on the distance-to-empty value, the range marker data indicating a boundary on a navigation map where the vehicle can travel to from the current location using the remaining fuel or electrical energy,
determine a location of an energy station within the boundary on the navigation map,
display the boundary on the navigation map and the energy station, and
iteratively update the display of the boundary on the navigation map based on an updated current location of the vehicle and an updated distance-to-empty value.

11. The navigation system of claim 10, wherein the navigation unit is further configured to remove a displayed energy station when a location of the displayed energy station is outside of the iteratively updated boundary on the navigation map.

12. The navigation system of claim 10, wherein the energy station is at least one of a gas station or a station providing electricity to electric vehicles.

13. The navigation system of claim 10, wherein the navigation unit is configured to set a current navigation display mode to a range marker mode in response to determining that the distance-to-empty value is equal to or less than a threshold value, and
   wherein when or after the current navigation display mode is set to the range marker mode, the navigation unit is configured to determine the range marker data, retrieve from the memory the location of the energy station, and the display is configured to display the boundary on the navigation map and the energy station.

14. The navigation system of claim 10, wherein the navigation unit is configured to determine a count of energy stations within the boundary on the navigation map, and set a current navigation display mode to a range marker mode in response to determining that the count of energy stations within the boundary on the navigation map is equal to or less than a threshold value, and
   wherein when or after the current navigation display mode is set to the range marker mode, the navigation unit is configured to determine the range marker data, retrieve from the memory the location of the energy station, and the display is configured to display the boundary on the navigation map and the energy station.

15. A computer-based method of displaying a boundary on a navigation map and one or more energy stations within the boundary on the navigation map, the method comprising:
   receiving or determining, using a navigation unit processor, a current location of the vehicle and vehicle energy data indicating at least one of remaining fuel or electrical energy for the vehicle;
   determining, using the navigation unit processor, a distance-to-empty value based on the vehicle energy data;
   determining, using the navigation unit processor, range marker data based on the distance-to-empty value, the range marker data indicating the boundary on the navigation map where the vehicle can travel from the current location using the remaining fuel or electrical energy;
   retrieving, from a memory communicatively coupled to the navigation unit processor, a location of an energy station within the boundary on the navigation map;
   displaying, using a display communicatively coupled to the navigation unit processor, the boundary on the navigation map and the energy station; and
   iteratively updating, using the navigation unit processor, the display of the boundary on the navigation map and the energy station based on an updated current location of the vehicle and an updated distance-to-empty value.

16. The computer-based method of claim 15, further comprising:
   setting, using the navigation unit processor, a current navigation display mode to a range marker mode in response to determining that the distance-to-empty value is equal to or less than a threshold value; and
   when or after the current navigation display mode is set to the range marker mode, performing the steps of determining, using the navigation unit processor, the range marker data; retrieving from the memory the location of the energy station; and displaying, using the display, the boundary on the navigation map and the energy station.

17. The computer-based method of claim 15, further comprising:
   determining, using the navigation unit processor, a count of energy stations within the boundary on the navigation map;
   setting, using the navigation unit processor, a current navigation display mode to a range marker mode when or after the count of energy stations within the boundary on the navigation map is equal to or less than a threshold value; and
   when or after the current navigation display mode is set to the range marker mode, performing the steps of determining, using the navigation unit processor, the range marker data; retrieving from the memory the location of the energy station; and displaying, using the display, the boundary on the navigation map and the energy station.

18. The computer-based method of claim 15, further comprising displaying, using the display, only an area within the boundary on the navigation map in a first display mode or theme, and displaying, using the display, the area within the boundary on the navigation map and other areas outside of the boundary on the navigation map in a second display mode or theme for focusing attention of a driver of the vehicle on the displayed boundary on the navigation map and the energy station.

19. The computer-based method of claim 15, further comprising:
   determining, using the navigation unit processor, a count of energy stations within the boundary on the navigation map; and
   wirelessly transmitting a signal to a remotely located computer-based system when the count of energy stations is zero for requesting assistance for a driver of the vehicle.

20. The computer-based method of claim 15, wherein the displayed boundary on the navigation map is in form of at least a part of a circle having a radius that varies based on the updated distance-to-empty value.

* * * * *